B. F. RHODES.
SEWING MACHINE.
APPLICATION FILED FEB. 25, 1915.

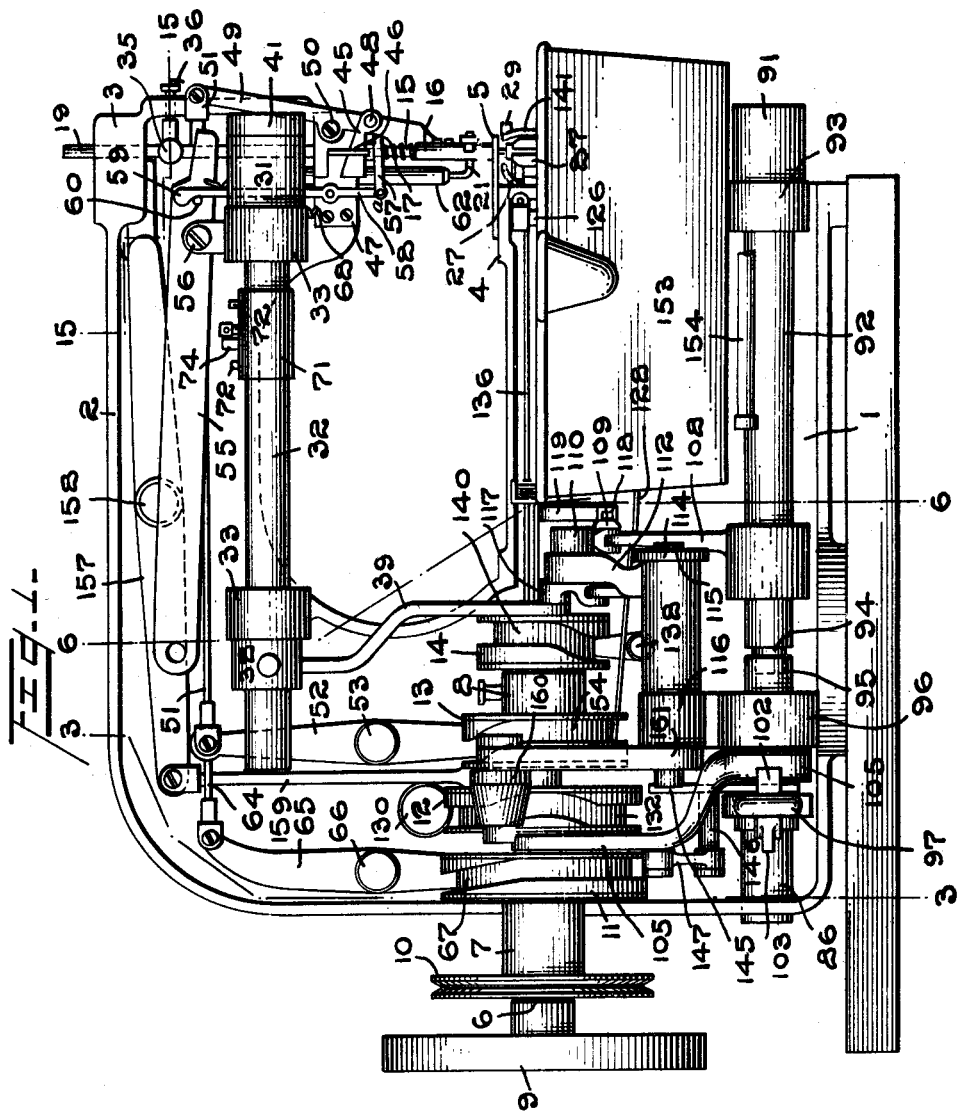

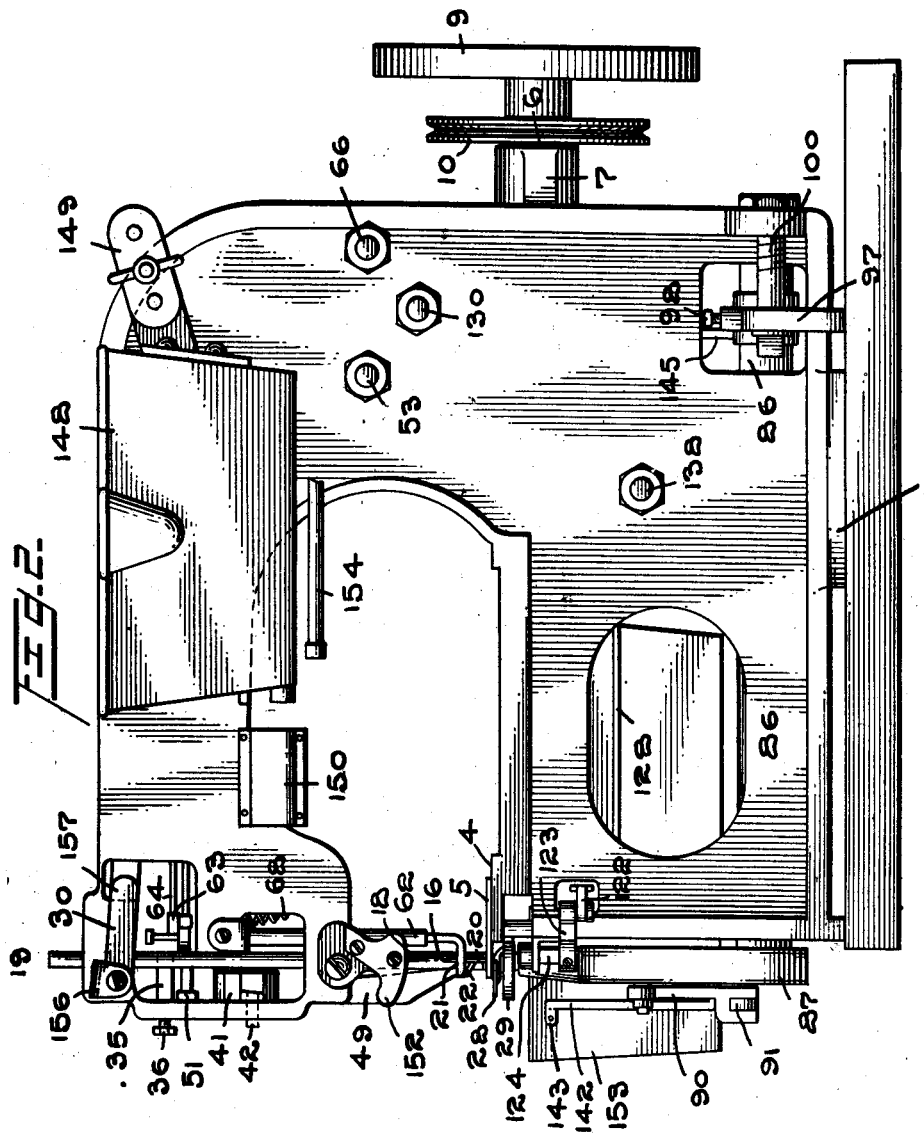

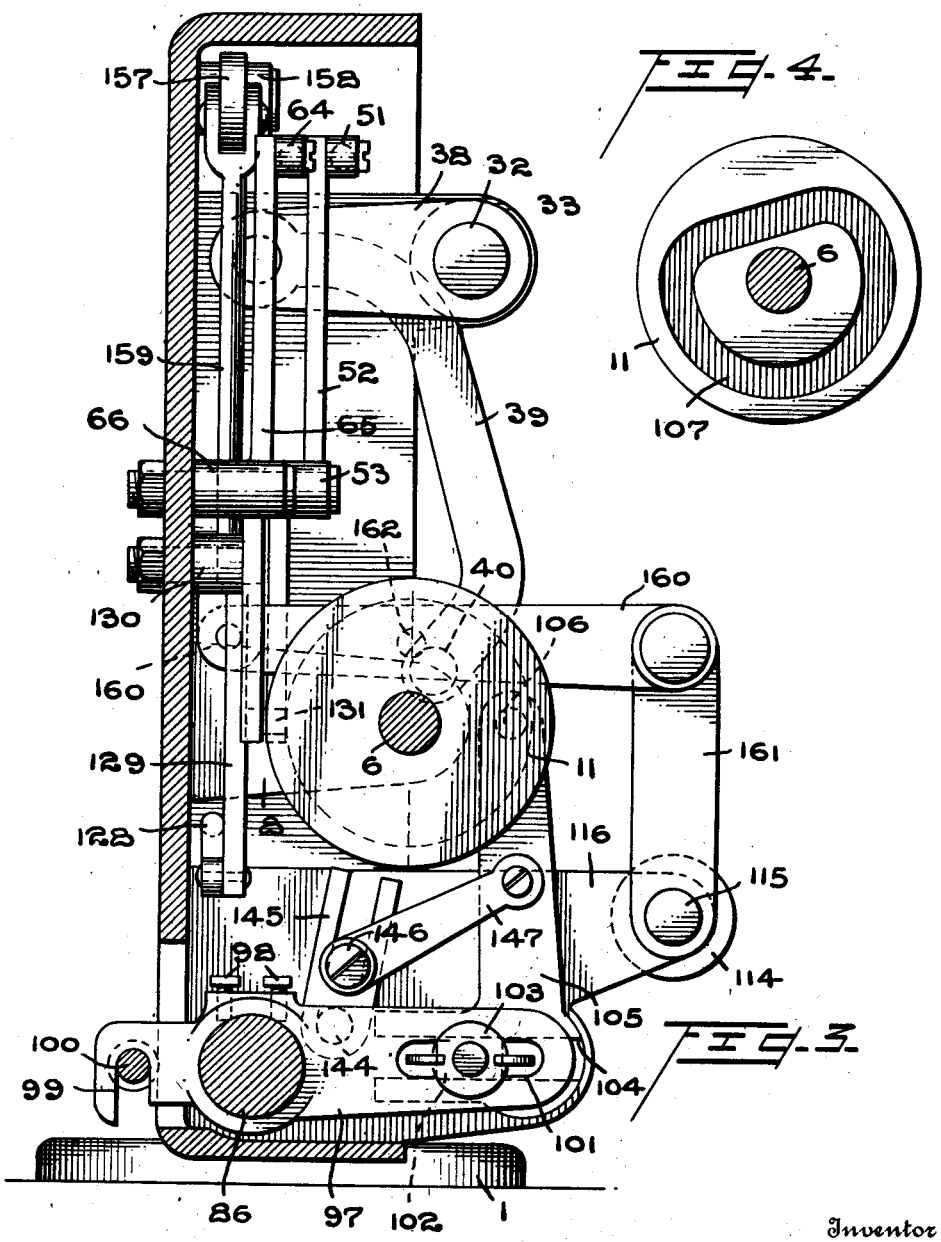

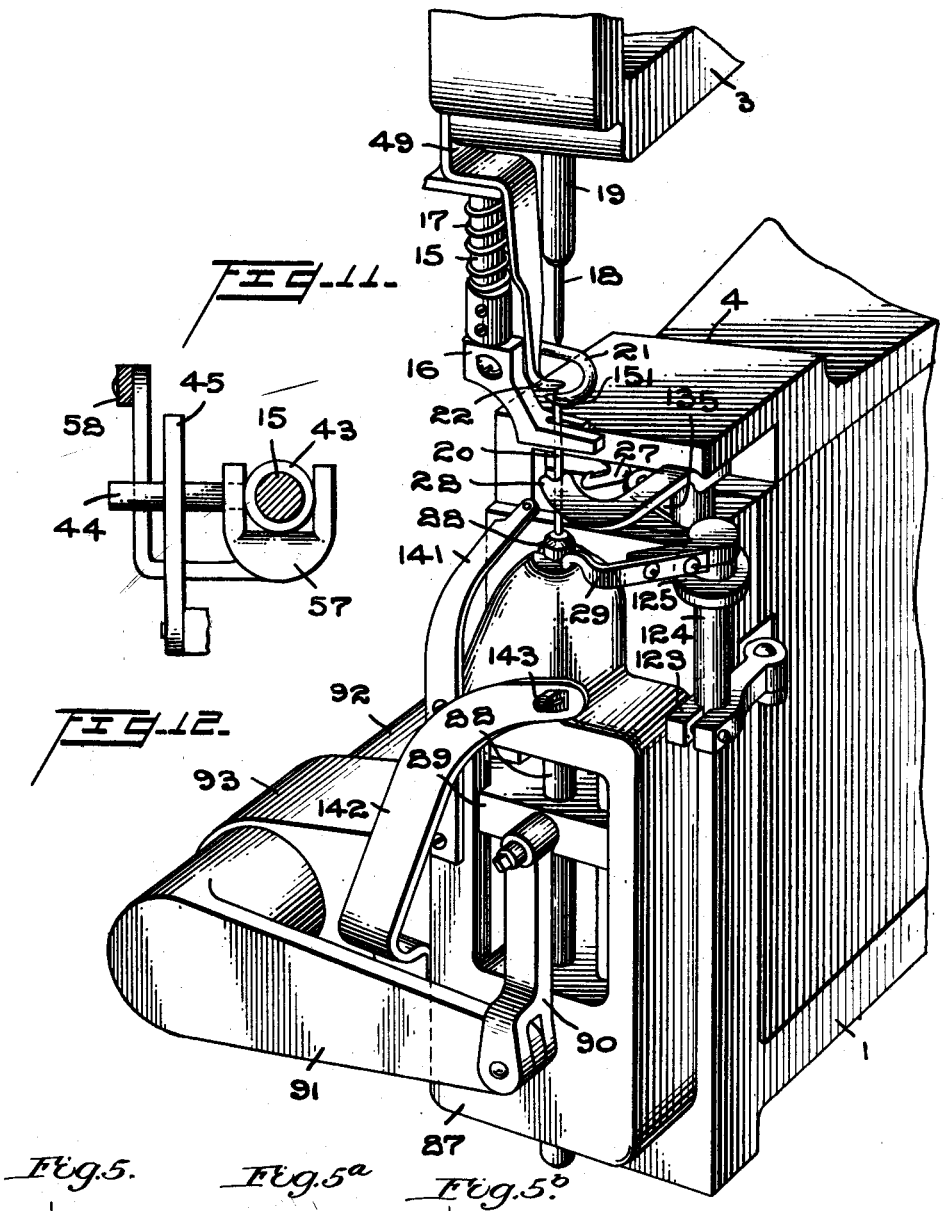

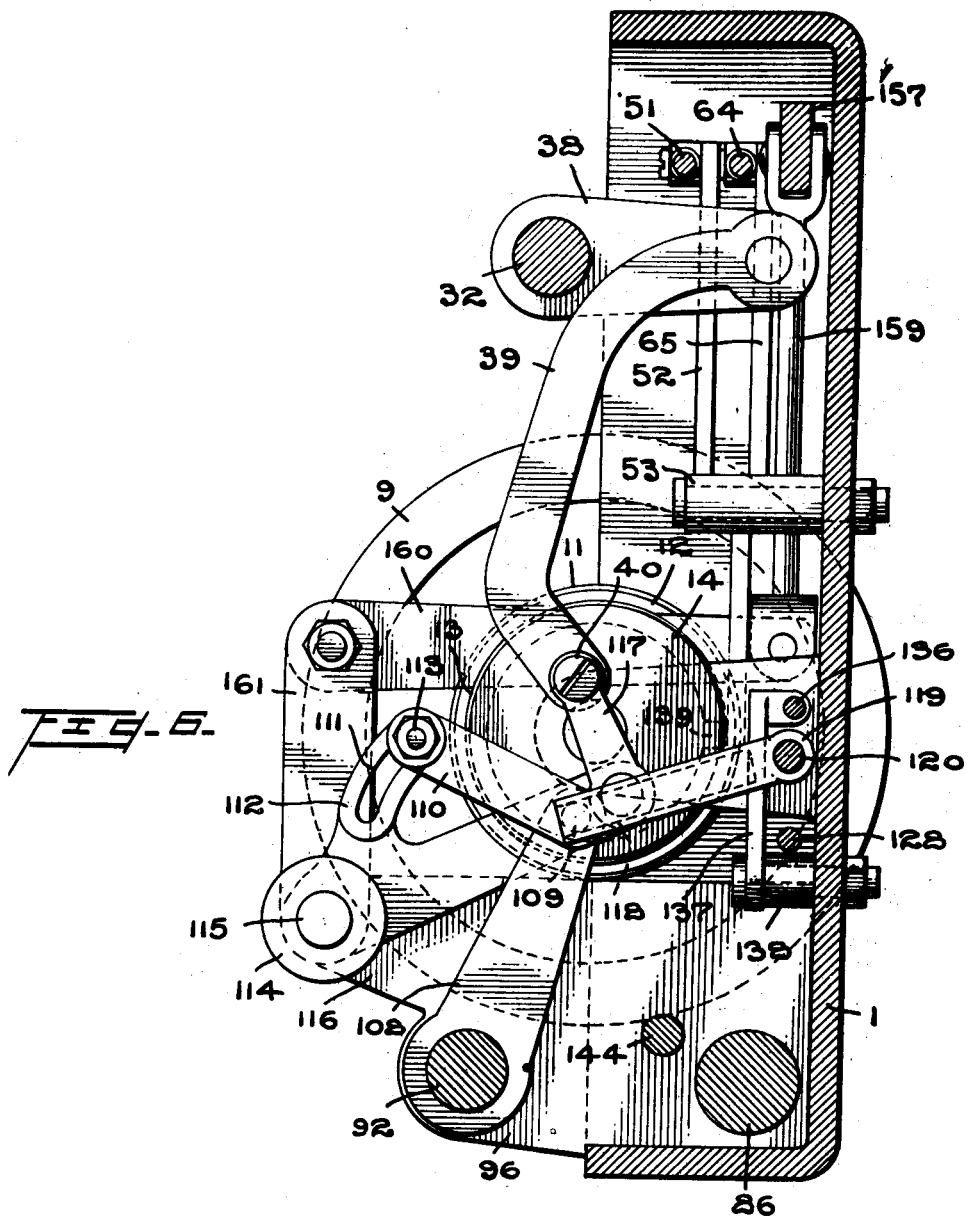

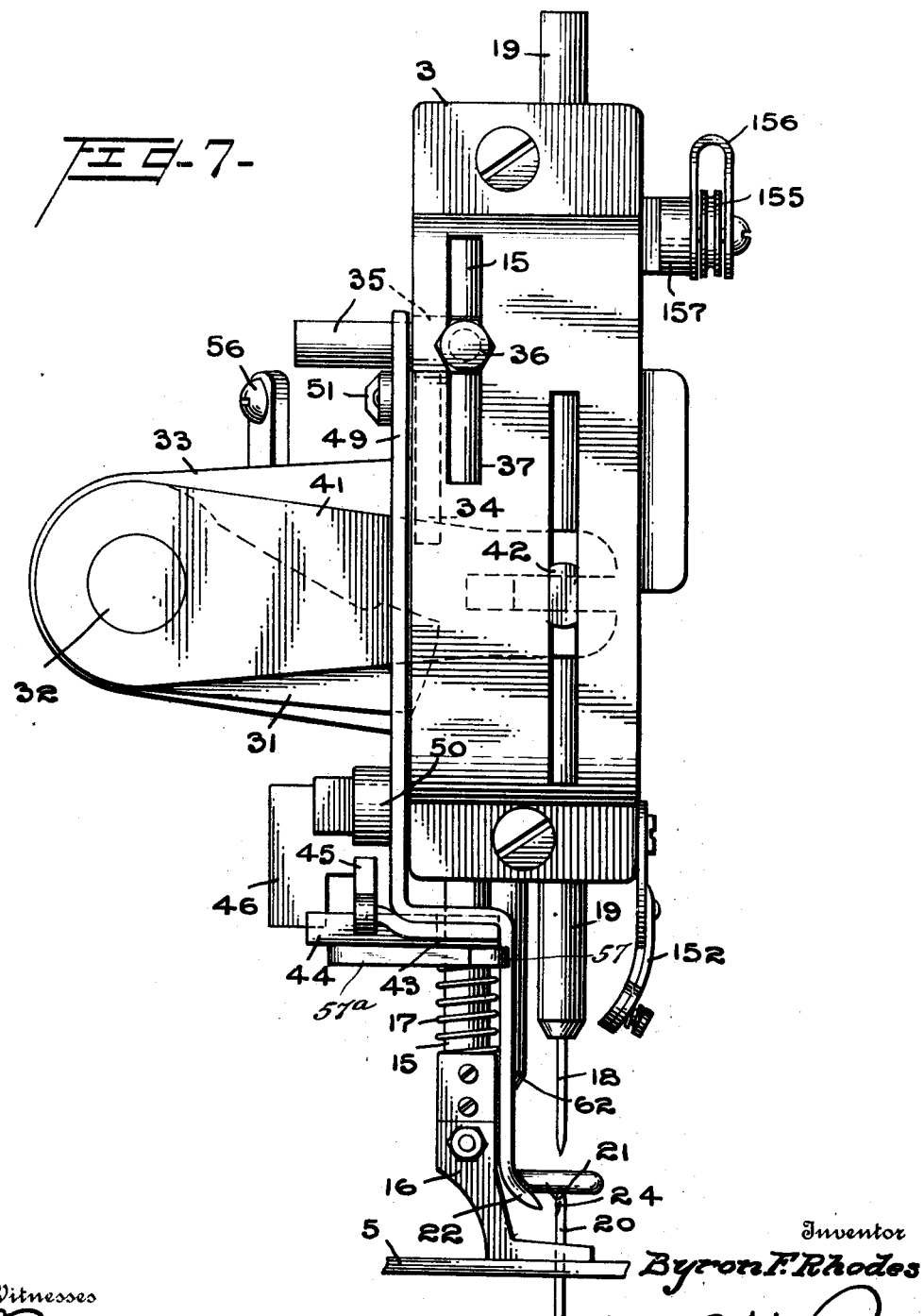

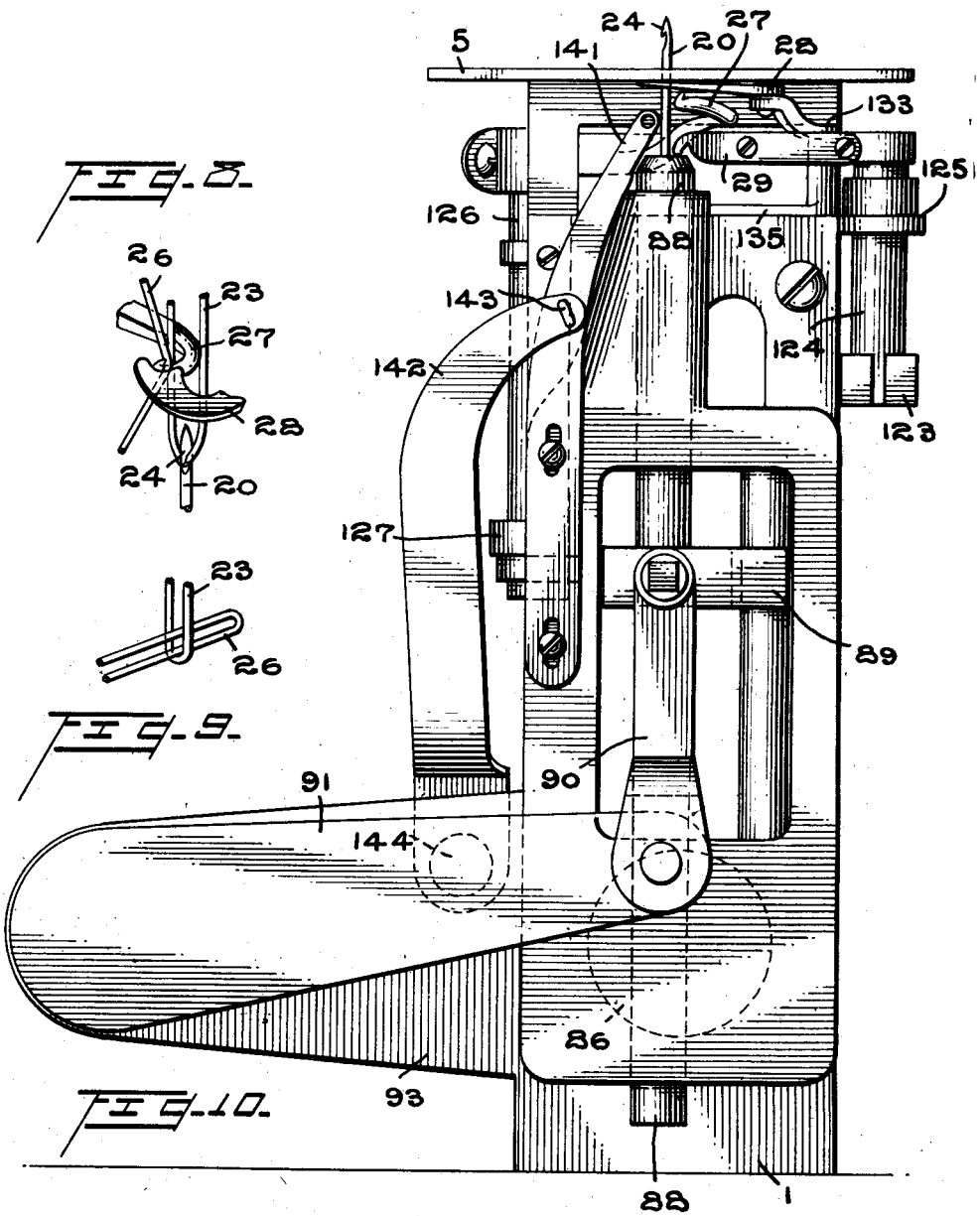

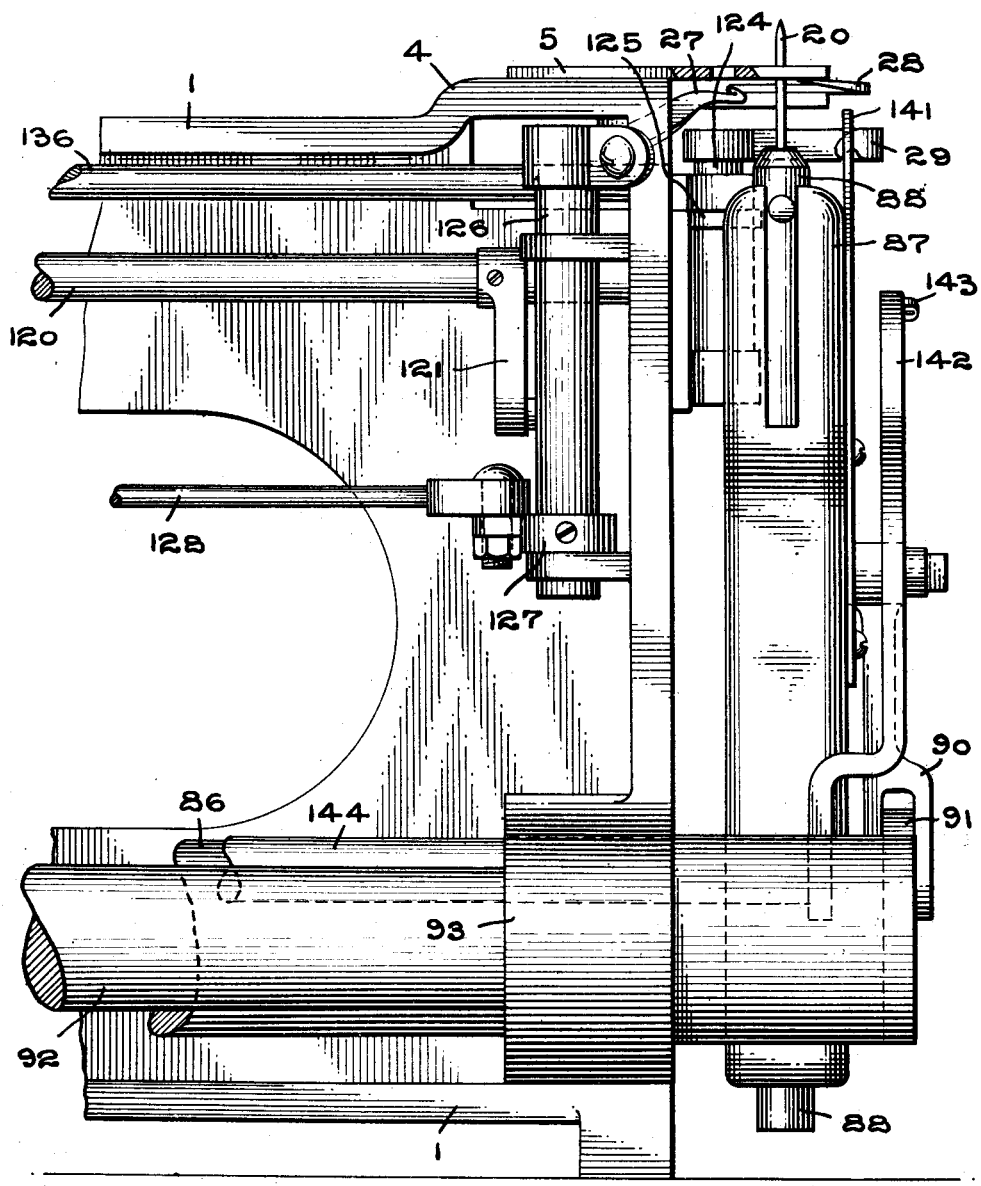

1,191,094.

Patented July 11, 1916.
11 SHEETS—SHEET 9.

FIG-14-

Inventor
Byron F. Rhodes

Witnesses:
By Joshua R. H. Potts
Attorney

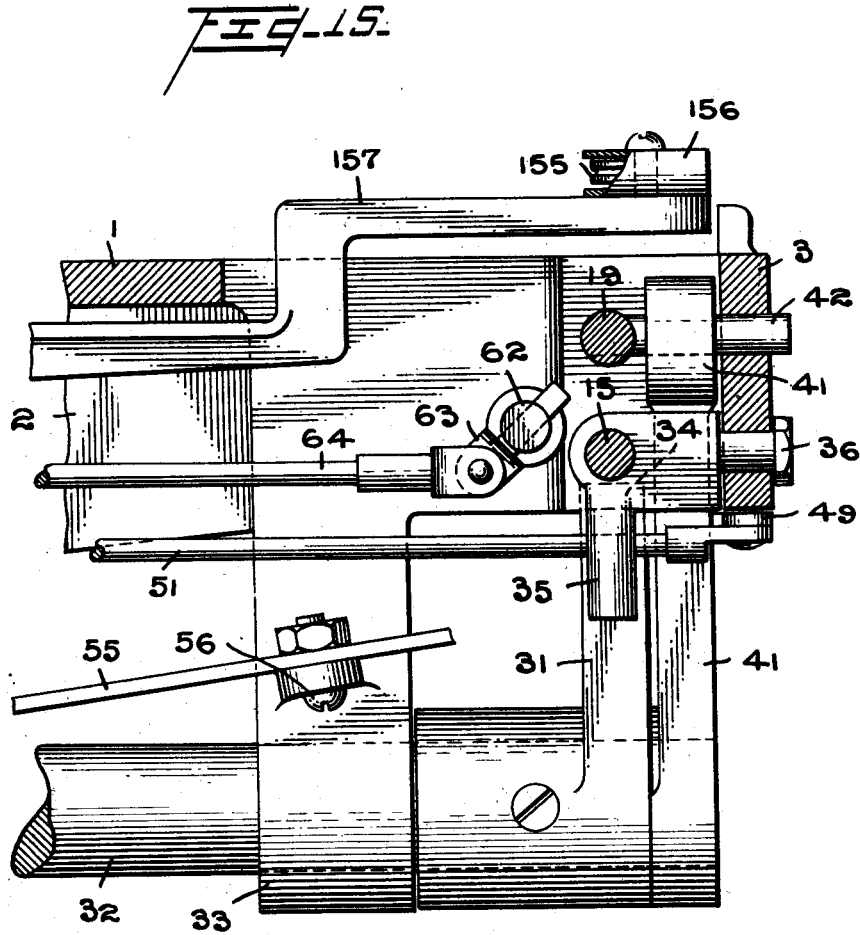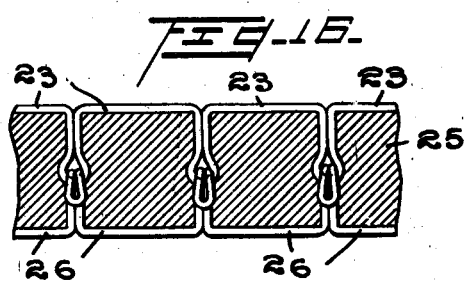

B. F. RHODES.
SEWING MACHINE.
APPLICATION FILED FEB. 25, 1915.

1,191,094.

Patented July 11, 1916.
11 SHEETS—SHEET 11.

Witnesses

Inventor
Byron F. Rhodes,
By Joshua R. H. Potts.
Attorney

UNITED STATES PATENT OFFICE.

BYRON FOSTER RHODES, OF PHILADELPHIA, PENNSYLVANIA, ASSIGNOR OF FIFTY-ONE ONE-HUNDREDTHS TO FERDINAND KELLER, OF PHILADELPHIA, PENNSYLVANIA.

SEWING-MACHINE.

1,191,091.  Specification of Letters Patent.   Patented July 11, 1916.

Application filed February 25, 1915. Serial No. 10,511.

*To all whom it may concern:*

Be it known that I, BYRON F. RHODES, a citizen of the United States, residing at Philadelphia, in the county of Philadelphia and State of Pennsylvania, have invented certain new and useful Improvements in Sewing-Machines, of which the following is a specification.

My invention relates to improvements in sewing machines, the object of the invention being to provide a sewing machine which is especially designed for reinforcing leather with a waxed thread, the stitches constituting plugs anchored in the leather, and operating to increase the wearing quality of the leather which is particularly adapted for use in the manufacture of soles and heels for shoes.

A further object is to provide a sewing machine of the character stated which is capable of high speed with little or no vibration, and in which the noise of operation is reduced to a minimum.

A further object is to provide a sewing machine with an improved arrangement of cams and power transmission therefrom to operate the coöperating parts of the machine to form the stitch.

A further object is to provide improved means for controlling the operation of the presser foot, causing the same to be locked against upward movement during a portion of the operation and released from time to time to permit the presser foot to be elevated to allow the movement of the leather under the foot.

A further object is to provide an improved construction of sewing machine in which a reciprocating awl operates in advance of and in coöperation with the needle and other parts, whereby the awl provides the opening for the needle and the stitch, and relieves the needle of the punching operation.

A further object is to provide improved means for feeding a predetermined length of cord so as to make the necessary stitch.

With these and other objects in view, the invention consists in certain novel features of construction and combinations and arrangements of parts as will be more fully hereinafter described and pointed out in the claims.

Figure 17:
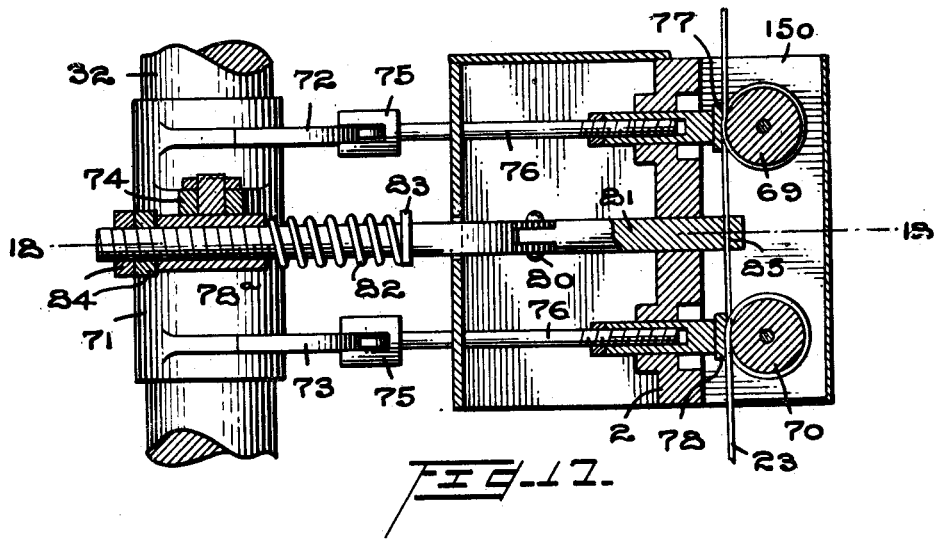
Figure 18:
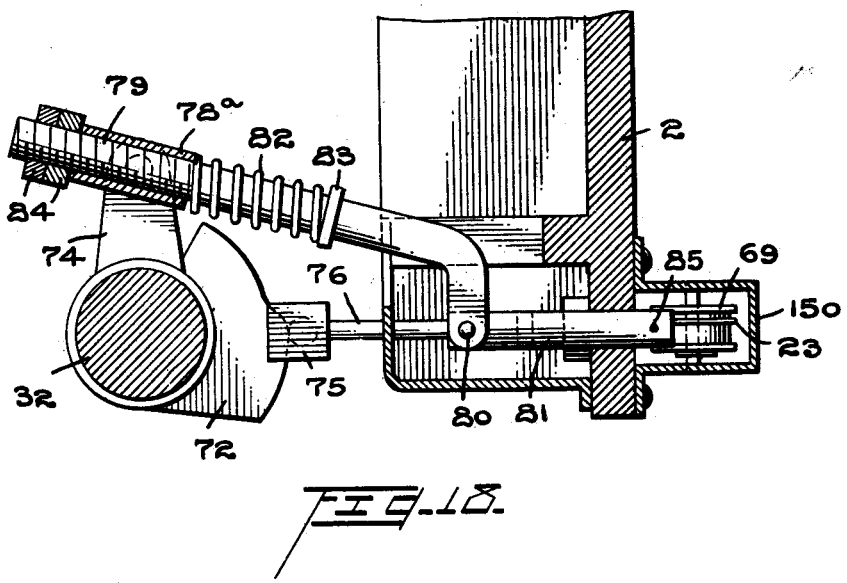

In the accompanying drawings: Figure 1 is a view in side elevation illustrating my improved sewing machine. Fig. 2 is a view in elevation of the opposite side of the machine. Fig. 3 is a view in vertical transverse section on an enlarged scale on the line 3—3 of Fig. 1. Fig. 4 is a face view of the cam 11. Figs. 5, 5ª, and 5ᵇ, are fragmentary sectional plan views illustrating three positions of the needle looping mechanism. Fig. 6 is a view in transverse section on an enlarged scale on the staggered line 6—6 of Fig. 1. Fig. 7 is a view in end elevation of the head of the machine with the parts adjacent thereto. Fig. 8 is a fragmentary perspective view illustrating the position of the wiper as it moves the lower thread into engagement with the barb of the lower hook. Fig. 9 is a fragmentary perspective view showing the first position of the looped threads. Fig. 10 is a view in end elevation showing the base of the machine and the parts carried thereby. Fig. 11 is a fragmentary perspective view showing the operative parts for forming the stitch. Fig. 12 is a fragmentary view in section on an enlarged scale showing the construction of the wedge block 57 and its coöperating parts. Fig. 13 is a fragmentary view in side elevation on an enlarged scale illustrating the stitch forming mechanism carried by the base of the machine. Fig. 14 is a plan view of Fig. 13. Fig. 15 is a fragmentary view in horizontal section on an enlarged scale on the line 15—15 of Fig. 1, certain parts of the construction being broken away and others omitted for purposes of clearness. Fig. 16 is an exaggerated view in section illustrating the stitch which is formed by my improved machine. Fig. 17 is an exaggerated view in horizontal section showing my improved thread fitting mechanism, and Fig. 18 is a view in section on the line 18—18 of Fig. 17.

1 represents the base of my improved machine which is made with an integral overhanging bracket arm 2, having a head 3 at its free end which is located above a work support 4 having a throat plate 5 thereon.

The base 1, arm 2, and head 3 constitute a single hollow casting which supports all of the parts of the machine.

The drive shaft 6 is supported in suitable bearings 7 and 8 which are integral with the base, and on this shaft 6, a fly wheel 9 and a drive pulley 10 are secured. On the shaft 6, four cams 11, 12, 13, and 14, are secured, and these cams control the operation of the coöperating parts of the machine as will hereinafter appear.

In the head 3, a presser bar 15 is mounted, and is provided at its lower end with a presser foot 16 adapted to bear upon the throat plate 5 and caused to elastically engage the same by means of a coiled spring 17. While this spring 17 is relatively light and operates to quickly lower the presser foot when permitted, I rely upon a positive locking means to hold the presser foot while at work.

19 represents a reciprocating bar which carries at its lower end an awl 18. This awl 18 is movable through the presser foot to cut an opening in the leather for the entrance of the needle 20 supported in the base 1, and movable upwardly through the throat plate 5.

A thread carrying hook 21 operates above the throat plate 5 in conjunction with a finger 22 to position the upper cord 23 under the barb 24 of the needle 20 as shown clearly in Figs. 5, 5ª, and 5ᵇ.

The needle 20 draws the upper cord 23 downwardly through the leather 25, and while in this position, the lower cord 26 is positioned through the loop of the upper cord as shown in Fig. 9 by means of a lower hook 27 and a wiper 28 as shown in Fig. 8. The upper cord is then released from the barb of the needle 20 by means of a releasing finger 29, and a take-up lever 30 draws the upper cord 23 upwardly to complete the stitch.

The stitch-forming and coöperating parts above described are all controlled by the cams 11, 12, 13, and 14 as will now be explained.

The presser bar 15 is elevated at regular intervals by means of a rocker arm 31 secured to a rocker shaft 32, the latter mounted in bearings 33 on the arm 2. The rocker arm 31 engages a depending lug 34 on a block 35, the latter secured to the upper portion of the presser bar and having a guide pin 36 movable in a slot 37 in head 3.

An arm 38 on rocker shaft 32 is connected by a link 39 with a crank pin 40 on one face of cam 14, so that the rotary movement of the cam 14 imparts a rocking movement to the shaft 32. This shaft 32 is also provided with a rocker arm 41 which has a bifurcated free end straddling a stud 42 on the awl bar 19, so that the said awl bar is caused to reciprocate through the medium of said arm 41.

I provide a positive clutch for locking the presser foot in its lowered position. This clutch constitutes a sleeve 43 which is located on the presser bar 15, and is provided with an arm 44 extending outwardly therefrom. This arm 44, adjacent its free end, is engaged by a wedge 45 which moves longitudinally between the arm 44, and a laterally projecting notched plate 46 on a bracket 47 secured to the head 3. The wedge 45 is pivotally connected to a lug 48 on a lever 49. This lever 49 is pivotally supported between its ends on a screw 50 secured to head 3, and at its upper end is connected by a rod 51 with a lever 52. The lever 52 is pivotally connected between its ends by means of a stud 53 with the base 1, and at its free end engages in the groove 54 of cam 13, so that the rotary movement of the cam causes the presser foot to be released at regular intervals and permitted to rise.

As it is necessary and desirable from time to time to manually elevate the presser foot, I have provided a lever 55 for this purpose. This lever 55 is pivotally supported near one end on a screw 56, and at its shorter end is adapted to engage under the block 35 and elevate the presser bar when permitted.

A bifurcated block 57 straddles the presser bar 15, and is located between the sleeve 43 and the coiled spring 17 below. An angle arm 57ª is secured to the bifurcated block, and is connected to a lever 58. The movement of the lever 58 causes the block 57 to move longitudinally and compel the sleeve 43 to assume a horizontal position with its inner walls parallel to the presser bar 15 so as to release the presser bar and allow the same to be elevated. This movement of the sleeve 43 is very slight, but is sufficient to permit the sleeve a locking and releasing position.

When the sleeve is in its locking position, the block is as shown in Fig. 12, and there is a long leverage between the block and the lever 58 which permits a certain movement of the block, enough to allow the sleeve 43 to position at an angle for gripping. When the lever 58 is operated, block 57 is maintained in a horizontal position and moved longitudinally to straighten the sleeve and release the presser bar.

Through the medium of the mechanism above described, when the lever 55 is operated, it will first cause the block 57 to release the sleeve from its angular or clutching position, and then the free end of the lever 55 will engage the block 35 to elevate the presser bar.

By reference particularly to Fig. 1, it will be noted that the lever 55 is spaced slightly from the block 35 to compensate for the operation of the block 57 before the lever 55 engages block 35.

The thread guiding hook 21 above referred to is secured to a vertically positioned rocker shaft 62 which is mounted in the head 3, and provided with a short crank arm 63 connected by a rod 64 with a lever 65. The lever 65 is pivotally supported between its ends as shown at 66, and at its free end operatively engages in the groove 67 of cam 11. I have not illustrated any particular means for operating the lever 55, as this may be done manually in any desired way, but I have illustrated a spring 68 which holds the lever in its normal inoperative position.

The lever 49 above referred to not only operates the wedge 45, but also operates the finger 22 which constitutes an integral part of said lever 49, and is located at the lower free end of the lever coöperating with the thread guiding hook 21 to position the cord in the barb of the needle as shown clearly in Fig. 5b.

The rocker shaft 32, in addition to its functions above described, controls the operation of my improved pull-off mechanism shown in detail in Figs. 17 and 18.

Pulleys 69 and 70 are supported on the arm 2 at one side thereof, and around these pulleys, the upper cord 23 is positioned.

A sleeve 71 is secured to rocker shaft 32, and is provided with two oppositely positioned cams 72 and 73 respectively, and between the cams an integral rocker arm 74 is provided on the sleeve 71. The cams 72 and 73 engage bifurcated blocks 75 on rods 76, and these rods 76 are adjustably connected to brake shoes 77 and 78 respectively which engage the pulleys 69 and 70 respectively, or rather the cord wound around the pulleys.

The rocker arm 74 has a sleeve 78ª at its free end through which a screw-threaded rod 79 is projected. The rod 79 is pivotally connected at one end as shown at 80 to a plunger 81, and coiled spring 82 is positioned around the rod 79 between a fixed collar 83 thereon, and the end of sleeve 78, to permit an elastic connection between the rocker arm 79 and the rod.

Adjusting nuts 84 are located on the rod 79 to adjust the tension of the spring, and the relative position of the parts. The plunger 81 has an opening 85 for the passage of the cord 23, and when this plunger is moved, it causes the cord to bulge between the pulleys 69 and 70, and give sufficient slack for the stitch.

As the cams 72 and 73 are oppositely positioned, it will be noted that when one cam causes its shoe 77 to engage the pulley 69, the other cam will permit the release of its shoe 78 from pulley 70 and vice versa, so that while one pulley is locked, the other is permitted to turn, so that by the adjustment of the nuts 84 on the rod 79, just the proper amount of slack cord may be provided for each operation.

A shaft 86 is supported in the base 1 and extends longitudinally thereof. On this shaft 86, at its forward end, a frame 87 is secured, and is caused to oscillate at predetermined intervals. This frame 87 supports and provides a mounting for the vertically reciprocating needle bar 88, carrying at its upper end the needle 20 which reciprocates through the throat plate 5. The needle bar 88 is provided with a block 89 sliding in frame 87 and connected by a link 90 with an arm 91 on a rocker shaft 92, which latter is supported in a suitable bearing 93, and has a thrust bearing 94 in the end of a short shaft 95, which latter extends through a bearing 96 on the base in alinement with bearing 93.

Shaft 86 has a lever 97 secured thereto by set screws 98, and at one end is recessed as shown at 99 to receive an adjusting screw 100, so that the shaft is permitted a slight longitudinal adjustment to properly position the frame 87. The opposite end of lever 97 is provided with a slot 101 in which a block 102 is adjustably secured by means of a wing nut 103. The block 102 engages in the groove 104 in an L-shaped lever 105. This lever 105 is secured at its angle on shaft 95, and its longer end is provided with a pin 106 located in a cam groove 107 in the face of cam 11, so that the rotary movement of the cam 11 imparts an intermittent oscillating movement to the needle bar supporting frame 87.

The rocker shaft 92 which reciprocates the needle bar 88, is provided with an arm 108 which is connected by a stud 109 with a link 110. The link 110 at its other end, is adjustably secured in a slot 111 in the shorter member of a bell-crank-lever 112 by means of a bolt 113. The bell-crank-lever 112 is provided at its angle with a sleeve 114 mounted to turn on a shaft 115, the latter supported in a bearing 115 on the base. The longer end of the bell-crank-lever 112 is connected by a link 117 to the crank pin 40 above referred to, so that the turning movement of cam 14 imparts a rocking movement to shaft 92, which movement may be adjusted by the location of the bolt 113 in slot 111.

The stud 109 which pivotally connects arm 108 with link 110, also projects into a longitudinal groove 118 in an oscillating arm 119, which latter is secured to a shaft 120 which extends longitudinally of the base. A crank arm 121 is secured to the end of shaft 120, and is connected by a link 122 with a crank arm 123 on a vertical shaft 124 which latter is supported in a bearing 125, and carries at its upper end the releasing finger 29 above referred to.

The hook 27 above referred to is clamped to a vertical shaft 126 having an arm 127 thereon which is connected by a rod 128 with a lever 129. This lever 129 is pivotally connected at its upper end to the base as shown at 130, and between its ends is provided with a stud 131 which operates in a cam groove 132 in cam 12.

The wiper 28 above referred to is provided at one end with a bearing sleeve 133 which turns on a post 134 on base 1, and said sleeve 133 is provided with an arm 135 which is connected to a rod 136 extending longitudinally of the base, and at its rear end connected to an arm 137. The arm 137 is pivotally supported at its lower end as shown at 138, and adjacent its upper end is provided with a stud 139 which is located in the groove 140 in cam 14.

The lower cord 26 is movable through a guide 141 secured to frame 87 and to provide a sufficient slack in this lower cord to form the stitch, I provide an arm 142 having a guide 143 thereon for the cord. This arm 142 is secured to a rocker shaft 144 which, at its rear end, is provided with a slotted arm 145 in which a bolt 146 is adjustably positioned, and pivotally and slidably connects a link 147 with the said arm 145. This link 147 is pivotally connected to the L-shaped lever 105, and receives its motion therefrom.

In forming my improved stitch in the leather or other material, I saturate the cords with wax or other similar material. The upper cord 23 is guided through a tank 148 in its passage between the tension device 149 and the pull-off controlling mechanism shown in Figs. 17 and 18. It will be noted that this pull-off controlling mechanism is inclosed in a casing 150 which may or may not be used as desired.

The cord 23 prior to its passage through the opening 151 in hook 21 is engaged by a tension 152, although it is to be understood that the invention is not limited to the particular tension devices for the cords: The lower cord 26 is drawn through a tank 153 secured to base 1, so as to receive its necessary quota of wax, and in order to maintain the contents of the tanks 148 and 153 in liquid form, I provide suitable burners 154 under the tanks which may operate by gas or other fluid.

Between the pull-off mechanism for the upper cord, and the tension device 152, the upper cord is passed over a pulley 155 supported in a bracket 156 at the free end of a take-up lever 157. This take-up lever is pivotally supported between its ends in the arm 2 as shown at 158, and at its rear end is connected by a depending link 159 with the free end of a pivoted arm 160. The arm 160 is pivotally supported at its outer end by means of an upright 161, and between its ends is provided with a pin 162 which rides in a cam groove in the face of cam 12, said cam groove corresponding in shape to the cam groove 107 in cam 11, as clearly shown in Fig. 4.

The operation of the several parts to form the stitch is as follows: The awl 28 moves downwardly through the leather 25 to punch the hole in the leather, and it will be noted that this awl is not round but flat, so that the hole is in the form of a slit which readily closes to tightly bind the stitch, and the waxed cord insures a positive seal to exclude moisture. As the awl moves upwardly, the needle 20 follows the same through the opening in the leather, and when the needle reaches its highest position as shown in Fig. 11, the thread guiding hook 21 moves in one direction, and the finger 22 in the opposite direction so as to position the upper cord 23 under the barb 24 of the needle 20, as shown clearly in Fig. 5. In other words, the needle when it rises is located to one side of the thread. The finger 22, by reason of the pivoted lever 49, will swing in one direction, and the hook 21 will move in the opposite direction so as to carry the thread in a horizontal position under the barb 24 as shown in Fig. 5ᵇ. The movement of the hook 21 is appreciably greater than that of the finger 22, although the latter moves slightly in a different direction to the direction of movement of the hook, and assists the hook in holding the thread more or less taut, and in a horizontal position under the barb of the needle. Fig. 5 shows the position of the hook 21 as it positions the cord 23 over the finger 22. Fig. 5ᵃ shows an intermediate position in which the cord is practically straight, and the finger and hook are moving in the direction of the arrows. Fig. 5ᵇ shows the completed stroke or movements of both the hook and the finger with the thread securely under the barb of the needle. When the finger returns to its former position, it releases the cord which is drawn down by the needle, and the operation as above described is repeated at the proper time. In these Figs. 5, 5ᵃ, and 5ᵇ, the dot and dash line indicates the line of feed of the leather, and it is understood that the needle has a slight oscillation in the direction of the line of feed to move the leather, as above described. The needle 20 then moves downwardly through the opening in the leather, drawing with it in loop formation, the upper cord 23. The lower hook 27 then moves through the looped upper cord, and the wiper 28 moves inwardly positioning the lower cord in the hook 27 as shown clearly in Fig. 8. Hook 27 then moves through the looped upper cord drawing with it the looped lower cord, and when reaching a pre-determined position, the hook 27 leaves the cord. During this movement, or just at the end of the movement of hook 27, the releasing finger 29 engages the upper cord 23 and releases the same from the barb 24 of needle 20. The take-up lever 157 then moves upwardly, drawing the two looped threads first to the position shown in Fig. 9, and upon the completion of the upward movement of the take-up lever, the threads will be held together as shown clearly in Fig. 16. As above described, the frame 187 is caused to oscillate at regular intervals, and this oscillation takes place when the needle 20 is projected upwardly through the leather, and such movement takes place when the presser foot 16 is elevated, so that the movement of the frame of the needle performs the two-fold function of feeding the leather forwardly and also of moving the needle so that its barb will engage under the upper thread 23, as the latter is held by the hook 20 and the finger 22. By adjusting this movement of the frame 8, which adjustment is accomplished by means of the block 102 and nut 103 shown in detail in Fig. 3, the space between the stitches can be controlled to suit conditions.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A sewing machine, comprising a reciprocating needle having a barb thereon, a pivoted lever, an oscillatory shaft, and members on the lever and shaft respectively constructed to move in different directions and hold a thread in substantially horizontal position to be engaged by the barb of the needle, a presser foot and means actuated by said pivoted lever for clamping the presser foot during the period of reciprocation of said needle, substantially as described.

2. In a sewing machine, a reciprocating barbed needle, a pivoted lever, a transversely movable thread guiding hook on said lever, a reciprocating thread carrying finger cooperating with said hook to position the thread under the barb of the needle, a presser bar and foot, a fixed member, a stud on said presser bar, and a wedge on said lever arranged between said fixed member and said stud, as and for the purpose specified.

3. A reciprocating barbed needle, a thread supporting hook movable transversely of the direction of movement of the goods, a thread supporting finger having an eccentric curvilinear motion about the needle to engage the thread on said hook and position the same under the barb of the needle, substantially as described.

4. A reciprocating barbed needle, means for imparting a lateral movement to the needle to feed the goods, a thread supporting hook movable transversely of the direction of movement of the goods, a thread supporting finger having an eccentric curvilinear motion about the needle to engage the thread on said hook and position the same under the barb of the needle, substantially as described.

5. A sewing machine, comprising a reciprocating needle having a barb thereon, a rocker shaft parallel with said needle and eccentrically arranged with relation thereto, said shaft having a curved thread-guiding hook at its lower end, and a finger movable transversely of the feed of the goods and coöperating with the hook to support a thread in horizontal position and receive the barb of the needle, substantially as described.

6. A sewing machine comprising a reciprocating needle having a barb thereon, a rocker shaft having a thread guiding hook at its lower end, a finger movable transversely of the feed of the goods and coöperating with the hook to support a thread in horizontal position to receive the barb of the needle, and means for moving the needle laterally, substantially as described.

7. A sewing machine, comprising a reciprocating needle having a barb thereon, a vertically positioned rocker shaft, a pivoted lever, a curved thread-guiding hook on the lower end of the rocker shaft, a finger on the lower end of the lever movable in substantially the same horizontal plane as the hook, and means for moving both the lever and the shaft to move the finger and the hook and position a thread under the barb of the needle, substantially as described.

8. A sewing machine, comprising a reciprocating needle having a barb thereon, a vertically positioned rocker shaft, a pivoted lever, a curved thread-guiding hook on the lower end of the rocker shaft, a finger on the lower end of the lever movable in substantially the same horizontal plane as the hook, means for moving the rocker shaft and the lever so as to compel the hook and arm to move in different directions, and position a thread under the barb of the needle, and means for positioning the loop of a lower thread through the loop of the first-mentioned thread when the latter is drawn downwardly by the needle, substantially as described.

9. A sewing machine, comprising a reciprocating needle having a barb thereon, a finger movable in a straight path, and a hook movable in a curved path and coöperating with the finger to position a thread under the barb of the needle; and means for simultaneously moving said finger and hook in different directions, substantially as described.

In testimony whereof I have signed my name to this specification in the presence of two subscribing witnesses.

BYRON FOSTER RHODES.

Witnesses:
MARIE JACKSON,
CHAS. E. POTTS.